United States Patent
Shyu et al.

(10) Patent No.: US 8,042,975 B2
(45) Date of Patent: Oct. 25, 2011

(54) PLANO-FRESNEL LED LENS AND LED ASSEMBLY THEREOF

(75) Inventors: San-Woei Shyu, Taipei (TW); Yi-Min Chen, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 353 days.

(21) Appl. No.: 12/469,084

(22) Filed: May 20, 2009

(65) Prior Publication Data

US 2010/0061106 A1 Mar. 11, 2010

(30) Foreign Application Priority Data

Sep. 10, 2008 (TW) .............................. 97134753 A

(51) Int. Cl.
*F21V 5/02* (2006.01)
*F21V 5/04* (2006.01)
*G02B 3/08* (2006.01)
(52) U.S. Cl. ......... 362/333; 362/339; 362/326; 359/742
(58) Field of Classification Search .................. 362/333, 362/339, 308, 309, 331, 235, 326, 311.02, 362/311.06, 311.12, 520, 522; 359/742
See application file for complete search history.

(56) References Cited

U.S. PATENT DOCUMENTS

| | | | |
|---|---|---|---|
| 4,428,031 A * | 1/1984 | Mori | 362/576 |
| 4,787,722 A * | 11/1988 | Claytor | 359/742 |
| 5,945,916 A * | 8/1999 | Collot | 340/815.4 |
| 6,399,874 B1 * | 6/2002 | Olah | 136/259 |
| 6,726,859 B2 * | 4/2004 | Suzuki et al. | 264/2.5 |
| 7,192,166 B2 * | 3/2007 | Shimura | 362/331 |
| 7,303,311 B2 * | 12/2007 | Shimura | 362/244 |
| 7,483,220 B2 * | 1/2009 | Kittelmann et al. | 359/742 |
| 7,813,055 B2 * | 10/2010 | Yasumoto et al. | 359/742 |
| 2005/0201101 A1 * | 9/2005 | Shimura | 362/330 |
| 2007/0064423 A1 * | 3/2007 | Shimura | 362/231 |
| 2008/0030990 A1 * | 2/2008 | Hanney | 362/240 |
| 2009/0002848 A1 * | 1/2009 | Yasumoto et al. | 359/742 |

FOREIGN PATENT DOCUMENTS

| | | |
|---|---|---|
| CN | 101013193 | 8/2007 |
| EP | 1091167 A2 | 4/2001 |
| ES | 2157829 | 8/2001 |
| JP | 3032069 | 2/1991 |
| JP | 2002-111068 | 4/2002 |
| JP | 2002-221658 | 8/2002 |
| JP | 2005-049367 | 2/2005 |
| JP | 2005-203499 | 7/2005 |

(Continued)

*Primary Examiner* — Bao Q Truong
(74) *Attorney, Agent, or Firm* — Muncy, Geissler, Olds & Lowe, PLLC

(57) ABSTRACT

A plano-Fresnel LED lens and a LED assembly thereof are revealed. The lens is a Fresnel lens whose optical surface on the forward side thereof is a plano surface having saw teeth with vertical taper (draft with vertical shape) so that the lens in the LED assembly concentrates light emitted from a LED chip to generate light whose peak intensity is an elliptic distribution pattern. Moreover, the lens and the LED assembly thereof satisfy certain conditions. Thereby, light from the LED chip is gathered by a single lens to form a preset specific distribution pattern and is satisfying requirement of the ratio of the luminous flux that is larger than 85%. The plano-Fresnel LED lens and a LED assembly thereof are applied to lights and flashlights in mobile phones or cameras.

8 Claims, 12 Drawing Sheets

FOREIGN PATENT DOCUMENTS

| | | |
|---|---|---|
| JP | 2005-257953 | 9/2005 |
| KR | 2007/0096368 | 10/2007 |
| TW | I261654 | 9/2006 |
| TW | 200711186 | 3/2007 |
| WO | WO-03/083943 | 10/2003 |
| WO | WO-2007/108663 | 9/2007 |

* cited by examiner

PLANO-FRESNEL LED LENS AND LED ASSEMBLY THEREOF

BACKGROUND OF THE INVENTION

The present invention relates to a LED lens and a LED assembly thereof, especially to a Plano-Fresnel LED lens whose peak intensity is an elliptic distribution pattern in a LED assembly, being applied to LED lighting devices, flashlights of mobile phones or cameras.

LED with features of low voltage, low power consumption and long operation life has been broadly applied to indicators, illuminators and so on. Moreover, due to pure light color, compact volume and flat package, LED is also used on flashlight of mobile phones. Yet light emitted from LED chip is a point source with uneven brightness. Thus a lot of studies focus on light collection. Besides minimization of chip size, improvement of light emitting efficiency, the lens used is also an important direction of technical development.

Along with development of modern technology, electronics are getting more miniature, compact and multi-functional. A lot of electronic products such as digital still cameras, PC cameras, network cameras, mobile phones and even personal digital assistant (PDA) are equipped with a lens. The LED lights or flashlight applied to such products are formed by a single or multiple LED array(s). For convenience of easy carrying and humanized design, LED flashlights or lighting devices not only meet requirements of luminous flux such as combinations of LED elements with different distribution patterns but also require miniature and lower cost.

In lens design of LED, there are two types-primary optical lens and secondary optical lens. The primary optical lens is a lens directly packaged on the LED chip and is for concentrating light while the secondary optical lens is an LED array formed by signal chip or a plurality of LED chips for spreading light beams. The conventional design of the primary optical lens is shown in ES2157829, symmetrical aspherical lens is used. Refer to JP3032069, JP2002-111068, JP2005-203499, US2006/187653, and CN101013193, spherical lens is used as primary optical lens.

In JP2002-221658, spherical lens is applied to Bulk-type LED. In high-level applications, the primary optical lens not only concentrates light but also generates specific distribution pattern with even peak intensity such as large angle, small angle, round or elliptic distribution pattern. The primary optical lens is used in combination with the LED array so as to achieve optimal optical effects.

The application of the primary optical lens is shown in FIG. 1A & FIG. 1B. A lens 23 is covered over a LED chip 21. Light emitted from the LED chip 21 passes through the lens 23 to be concentrated to form a preset light pattern. Or a layer of secondary optical lens is added over the primary optical lens for brightness uniformity. There are various designs of the primary optical lens and some of them use a Fresnel optical surface, as revealed in WO/2003/083943, JP2005-049367, U.S. Pat. No. 6,726,859, US2007/0275344, US2008/0158854, EP1091167, and TW200711186 etc.

However, above conventional technique uses Fresnel lens covered over a plurality of LEDs, working as a secondary optical lens like a projector. Due to fast development of LED light emitting efficiency, the applications of a single LED have become more important. In the LED array or light sources formed by a plurality of LEDs, the brightness become in uniformity due to compensation of cross light beams through the lens. As to the single LED, the design of the primary optical lens is more complicated than that of the LED array or light sources formed by multiple LEDs because both the light concentration efficiency and the uniformity of brightness of the primary optical lens should be considered. A set of Fresnel zone plates is disposed on surface of the Fresnel lens and a zone pitch thereof is increasing gradually from the inside to the outside or from the outside to the inside. Besides light guiding and light collection, the Fresnel lens with features of light weight, compact volume and plastic nature and lower cost is suitable for being applied to lighting systems. For example, in JP2005-257953 and US 2006/0027828, a Fresnel lens with a single-side or double-side is disposed over a LED light source so as to generate uniform brightness, as shown in FIG. 1A & FIG. 1B. Refer to TW560085, by a paraboloid surface and a Fresnel lens, reducing the divergent light and uniform brightness may be formed. Furthermore, refer to Korean 1020070096368 and TW 1261654, a LED primary lens is made by a Fresnel lens but the distribution pattern thereof is a round distribution pattern.

However, as to multiple point LED lighting systems, brightness uniformity of both illuminance and light intensity should be considered. Conventional techniques usually use a certain ratio of the zone pitch to the zone height or changing zone pitch with changing zone height. For lighting system formed by a plurality of LEDs, changing zone pitch is better for matching requirements of uniform illuminance/light intensity. As to a single LED primary optical lens, the zone pitch depends on optical properties of the lens. Although the Fresnel lens with complicated surface and higher manufacturing cost, it provides better light efficiency and brightness uniformity, especially being applied to lighting devices with a single LED. In order to make light from single LED achieve higher efficiency, the present invention provide a primary optical lens of the LED made by Fresnel lens so as to concentrate light from surface of the LED chip and generate an elliptic distribution pattern with uniform peak intensity.

SUMMARY OF THE INVENTION

Therefore it is a primary object of the present invention to provide a plano-Fresnel LED lens and a LED assembly thereof. The LED assembly having a LED chip for emitting light, a Fresnel lens fort concentrating light and generating Elliptic distribution pattern with uniform peak intensity and a gel layer filled between the Fresnel lens and the LED chip for sealing. Wherein, the Fresnel lens can be a plano-concave lens whose outer surface is tapered or perpendicular. A concave surface of the Fresnel lens is an optical surface facing the light source and is able to be aspherical or spherical while a plano-Fresnel surface thereof is an optical surface on forward side and is a Fresnel optical surface. Moreover, the light-collecting curved surface ($R_F$) for forming the plano-Fresnel surface can be aspherical or spherical surface and its zone can be draft with vertical shape and equal zone pitch and satisfying the following conditions:

$$0.7 \leq \frac{f_s}{r_n} \leq 2.2 \tag{1}$$

$$0.1 \leq (N_{d2} - 1)\frac{d_2}{f_s} \leq 1.25 \tag{2}$$

$$\sqrt{\left(\frac{\phi_x - \omega_x}{\pi}\right)^2 + \left(\frac{\phi_y - \omega_y}{\pi}\right)^2} \cdot f_g \leq 0.6 \tag{3}$$

wherein:

$$f_g = \left|\left(\frac{1}{R_1} - \frac{1}{R_F}\right) \cdot f_s\right| \quad (4)$$

$$\omega_x = \tan^{-1}\left(\frac{D}{d0 + d1 + d2 + Lx}\right) \quad (5)$$

$$\omega_y = \tan^{-1}\left(\frac{D}{d0 + d1 + d2 + Ly}\right) \quad (6)$$

Wherein $f_s$ is effective focal length of the lens, $r_n$ is radius of a last zone of a Fresnel optical surface R2, $d_2$ is thickness of the lens on a central axis Z, $N_{d2}$ is refractive index of the lens, $2\phi_x$ (deg.) is an angle of a half of highest light intensity ($I_{1/2}$) in the X direction of the light emitted from the lens, $2\phi_y$ (deg.) is an angle of a half of highest light intensity ($I_{1/2}$) in the Y direction of the light emitted from the lens, 2Lx is length of the LED chip in the X direction, 2Ly is length of the LED chip in the Y direction, fg is a relative focal length of the lens, $R_1$ is a radius of an optical surface on the source side, $R_F$ is a radius of a plano-Fresnel surface on the forward side, $d_0$ is thickness of the LED chip, $d_1$ is thickness of a gel layer on the central axis, D is radius of an optical surface on the forward side.

Moreover, in order to meet various requirements of distribution pattern and light concentration properties, the radius $R_F$ of the light-collecting curved surface ($R_F$) (a convex surface) for forming the plano-Fresnel surface of the Fresnel lens can be set as a radius of a spherical surface or an aspherical surface.

In order to simplify the manufacturing of the device, the plano-concave Fresnel lens can be replaced to be a plano-plano lens made from optical material whose forward-side optical surface is a plano-Fresnel surface and is satisfying from equation (1) to equation (3). Where the optical material may be selected by plastic resin or glass.

In order to improvement concentrating efficiency of LED assembly, the outer surface of the Fresnel lens may be tapered with taper v whose forward-side optical surface is a Fresnel convex surface and is satisfying from equation (1) to equation (3).

It is another object of the present invention to provide a LED assembly that includes a plano-concave or a plano-plano Fresnel LED lens and a LED chip and the LED assembly features on its elliptic distribution pattern and the ratio of luminous flux is larger than 85% ($\eta=\beta/\alpha \geq 85\%$) and is satisfying the following conditions:

$$E_{1/2} \leq 0.6 E_d \quad (7)$$

wherein $$E_{1/2} = \frac{I_{1/2}}{(\pi r_n \cdot \sin\phi_x) \cdot (r_n \cdot \sin\phi_y)} \cdot \eta \quad (8)$$

wherein $r_n$ is radius of a last zone of the Fresnel surface R2, $\alpha$ is luminous flux of the LED chip, $\beta$ is luminous flux at infinity ($100 \times f_s$) of the forward side without consideration of attenuation, $\eta$ is ratio of the luminous flux, $E_d$ is incidence of the LED chip, and $E_{1/2}$ is incidence at the half of highest light intensity from the Fresnel lens surface.

The plano-Fresnel LED lens and the LED assembly thereof according to the present invention have elliptic distribution pattern and satisfies the requirement of luminous flux larger than 85%. Moreover, the thickness of the lens is minimized so that the lens can be applied to a single LED, LED arrays for lighting, or flashlights on mobile phones and cameras.

DETAILED DESCRIPTION OF THE PREFERRED EMBODIMENT

Figure 6:
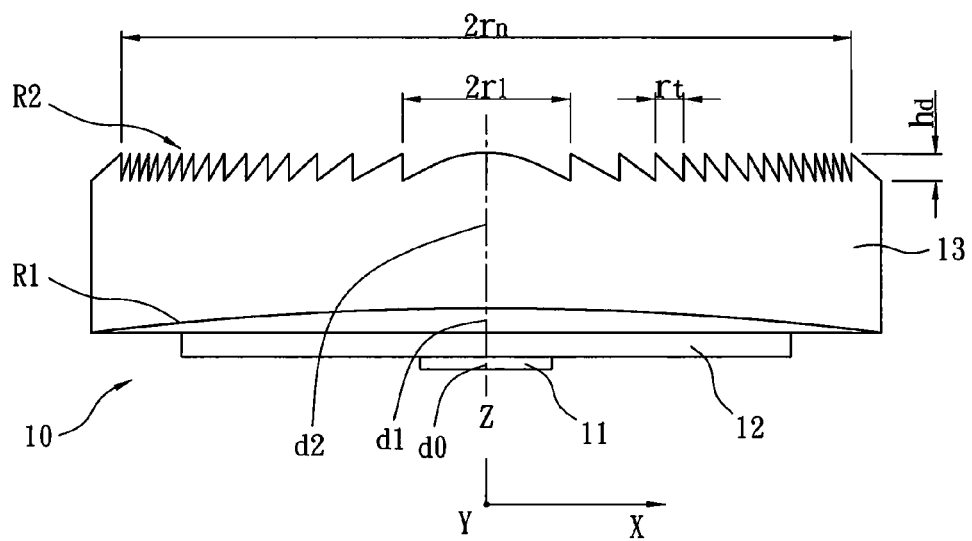
FIG. 6 is a schematic drawing showing LED assembly of an embodiment according to the present invention.

Refer to FIG. 6, a LED assembly 10 according to the present invention comprises a LED chip 11, a gel layer 12 and a lens 13 along a central axis Z from a source side to a forward side. When light is emitted from the LED chip 11, passing through the gel layer 12 and being concentrated by the lens 13 to form a light beam with elliptic distribution pattern symmetrical to the central axis Z that projects onto the forward side. The lens 13 is made of optical material such as optical glass or optical plastic resin. A concave surface of the lens 13 is a source-side optical surface R1 facing on the light source and is aspherical or spherical optical surface. The other side opposite to the concave surface is a plano-Fresnel optical surface R2 with draft with vertical shape and facing on the forward side. The plano-Fresnel optical surface R2, the lens thickness $d_2$ and the effective focal length $f_s$ of the lens 13 satisfy the equation (1) and the equation (2). The angle $2\phi$ (having $2\phi_x$ in the X direction and $2\phi_y$ in the Y direction) of distribution pattern of light intensity formed by the lens 13 satisfies the equation (3).

The material of the gel layer 12 is not restricted. In the LED assembly, optical resin or silicon gel is commonly used.

Figure 1A:
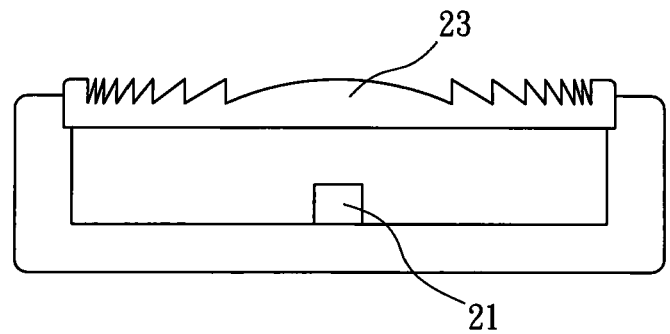
FIG. 1A shows LED assembly of a conventional LED lens.
Figure 1B:
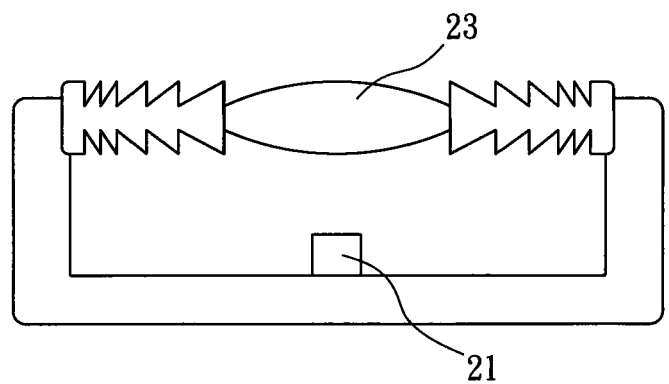
FIG. 1B shows LED assembly of a conventional LED lens.
Figure 2:
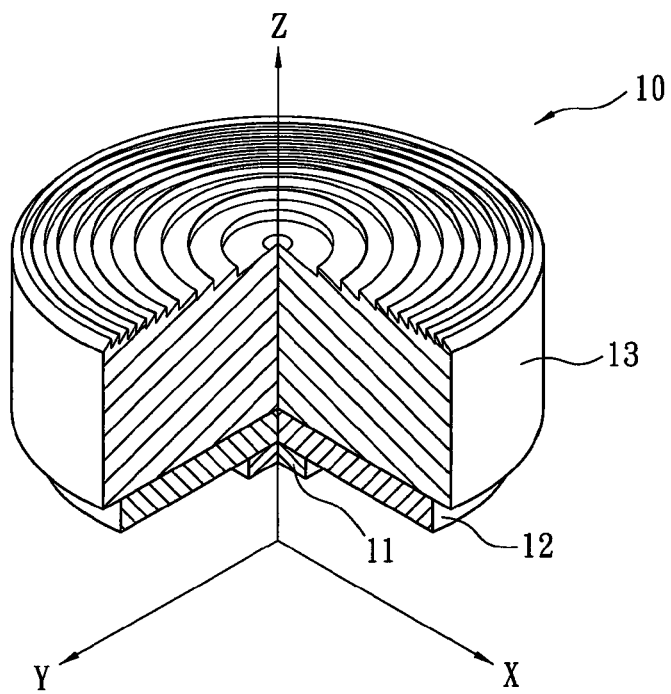
FIG. 2 is a perspective view of LED assembly of a Fresnel LED lens without taper according to the present invention.

Refer to FIG. 2, the LED assembly 10 is a plano-Fresnel LED lens 13. An optical surface R1 of the lens 13 on source side is a flat surface (R1=∞) while the other optical surface R2 (opposite surface) on forward side is a plano-Fresnel optical surface with vertical shape draft.

Figure 3:
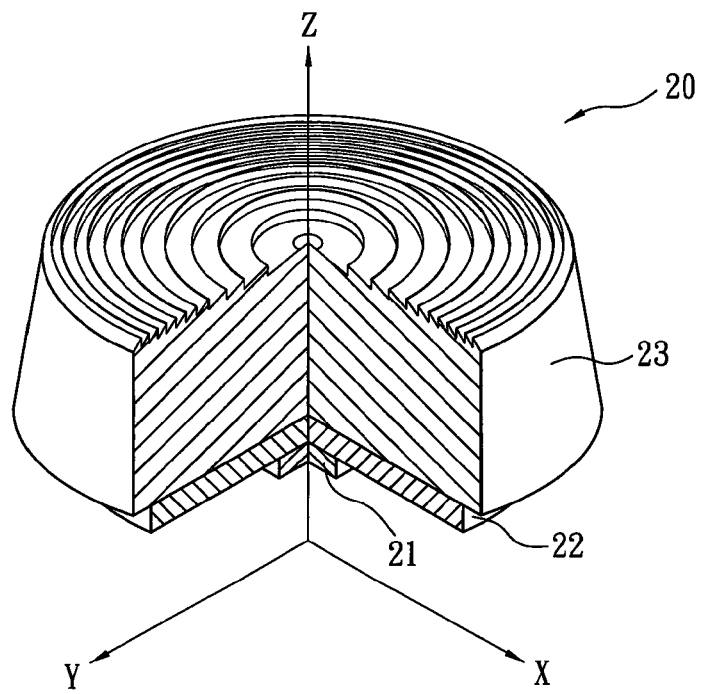
FIG. 3 is a perspective view of LED assembly of a Fresnel LED lens with taper according to the present invention.
Figure 7:
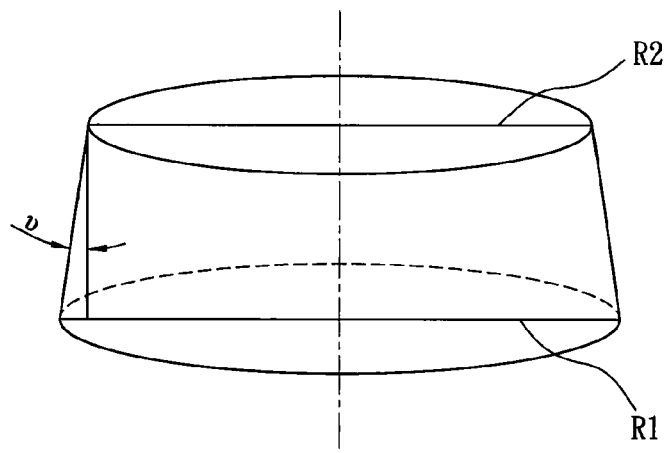
FIG. 7 is a schematic drawing showing taper of a Fresnel LED lens of an embodiment according to the present invention.

Refer to FIG. 3, a further embodiment of the LED assembly 20 is revealed. Along with the central axis Z from the source side to the forward side, the LED assembly 20 comprises of a LED chip 21, a gel layer 22 and a plano-Fresnel lens 23. The difference between this LED assembly 20 and the LED assembly 10 in FIG. 2 is in that an outer surface of the lens 23 is with taper v, as shown in FIG. 7 so as to reduce divergent from the side surface of the lens 23 and improve the optical efficiency.

Figure 4:
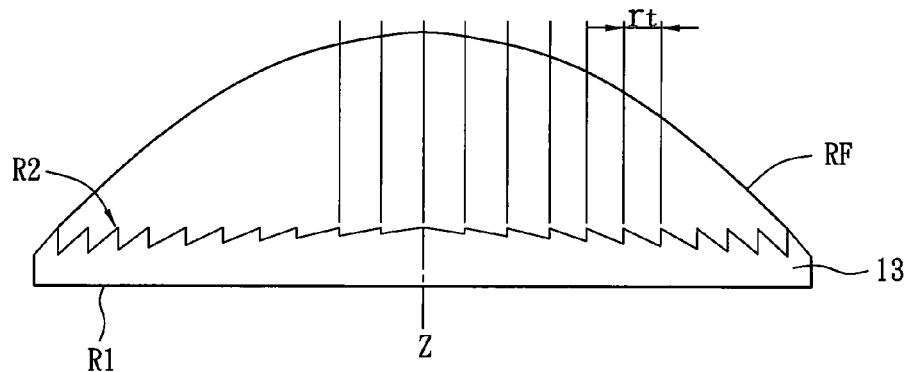
FIG. 4 shows a relationship between the radius of a convex surface and a plano-Fresnel surface of a Fresnel LED lens having draft with vertical shape and equal zone pitch.
Figure 5:
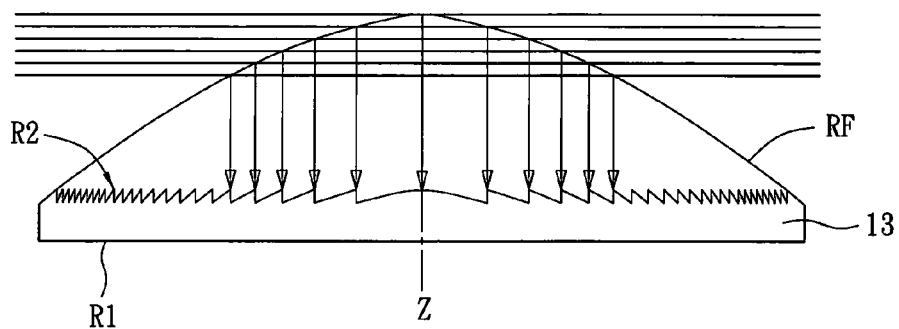
FIG. 5 shows a relationship between the radius of a convex surface and a plano-Fresnel surface of a Fresnel LED lens having draft with vertical shape and equal zone height.

The forward-side optical surface R2 of the lens 13 or the lens 23 of the invention is a plano-Fresnel optical surface having draft with vertical shape, as shown in FIG. 4 & FIG. 5. The Fresnel optical surface R2 is transformed by the radius of $R_F$. By means of different ways of transformation the radius of $R_F$, various Fresnel optical surface R2 are formed, as equal zone pitch (FIG. 4) and equal zone height (FIG. 5).

Refer to FIG. 4, a plano-Fresnel optical surface R2 with equal zone pitch is shown. The zone pitch $r_t$ thereof is a fixed value. The light optical surface with radius of $R_F$ is transformed into a multi-zone plano-Fresnel optical surface R2 by equal zone pitch $r_t$ but with unequal zone height $h_d$ (FIG. 6). Refer to FIG. 5, a plano-Fresnel optical surface R2 with equal zone height is shown. That means the zone height $h_d$ is a fixed value. The optical surface with radius of $R_F$ is transformed into a multi-zone Fresnel optical surface R2 by equal vertical zone height $h_d$ but with unequal zone pitch $r_t$.

Figure 9:
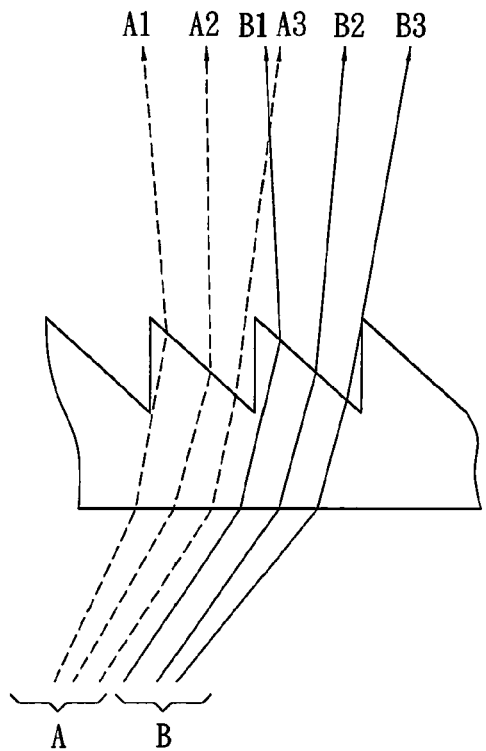
FIG. 9 shows refraction of group A light beams and group B light beams by a Fresnel LED lens.

Each zone on the forward-side plano-Fresnel optical surface R2 is formed by a slope and a vertical zone surface (ring-shaped surface) so that the zone is called draft with vertical shape. The radius of the first zone is $r_1$ and the radius of the last zone is $r_n$. As shown in FIG. 9, when light emits into the plano-Fresnel optical surface R2, the light is refracted by the slope of each zone so as to achieve similar optical effects of paraboloid optical surface.

Figure 10:
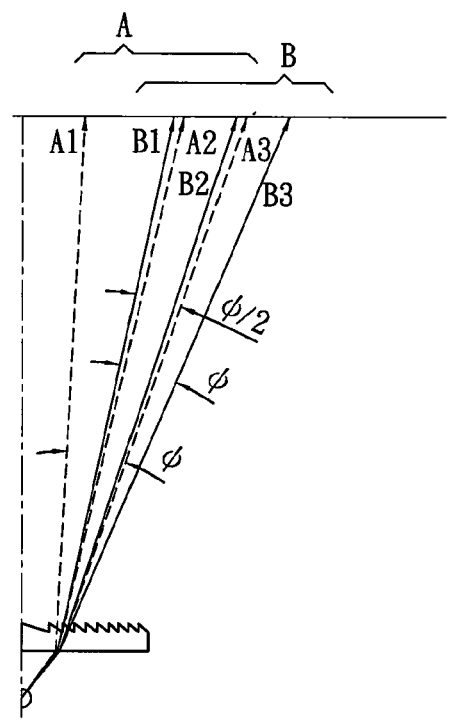
FIG. 10 shows light path of group A light beams and group B light beams passing through a Fresnel LED lens.
Figure 11:
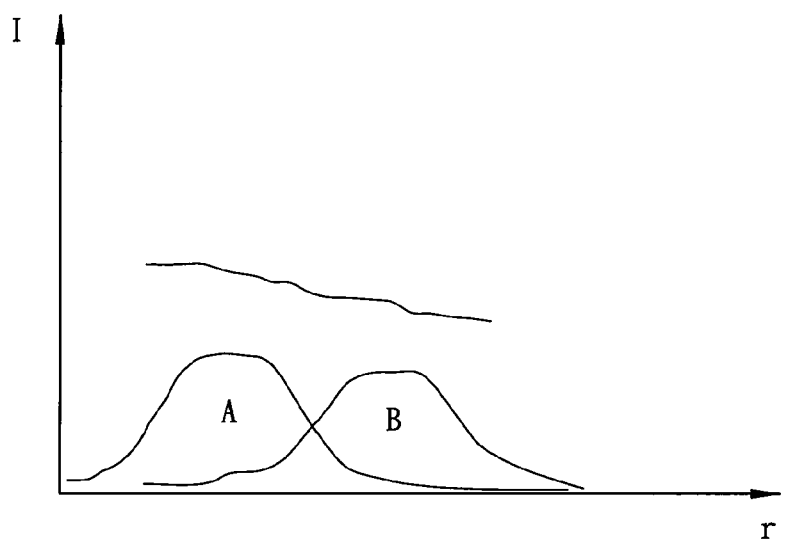
FIG. 11 is a schematic drawing uniform light intensity formed by combination of group A light beams with group B light beams in FIG. 9 & FIG. 10.

Refer from FIG. 9 to FIG. 11, after being refracted by the Fresnel optical surface R2, the angles of emergence φ of the group A light beams (such as A1, A2, A3 light beam) on an object are different due to different incident angles of the light beams A1, A2, A3, as shown in FIG. 10. On the position parallel to the central axis toward vertical direction, the group A light beams have higher light intensity in the center thereof. Similarly, after being refracted by the plano-Fresnel optical surface, a light-beam group B (such as B1, B2, B3 light beam) is also a light-beam group whose light intensity is higher in the center thereof. By the combinations of group A and group B, as shown in FIG. 11, a light pattern with even light intensity is generated so as to improve brightness uniformity.

If the optical surface R1 of the lens 13 or the lens 23 is formed by aspherical optical surface, the Aspherical Surface Formula is the equation (9):

$$Z = \frac{ch^2}{1+\sqrt{(1-(1+K)c^2h^2)}} + A_4h^4 + A_6h^6 + A_8h^8 + A_{10}h^{10} \quad (9)$$

wherein c is curvature, h is height of the lens, K is conic constant, and $A_4$ to $A_{10}$ respectively are Nth Order Aspherical Coefficients.

The curvature radius of $R_F$ of the plano-Fresnel optical surface R2 is also defined by the equation (9), wherein Conic Constant of the curvature radius $R_F$ of the paraboloid for collecting light is −1 (K=−1) for paraboloid surface, is 0 (K=0) for spherical surface, respectively.

Figure 8:
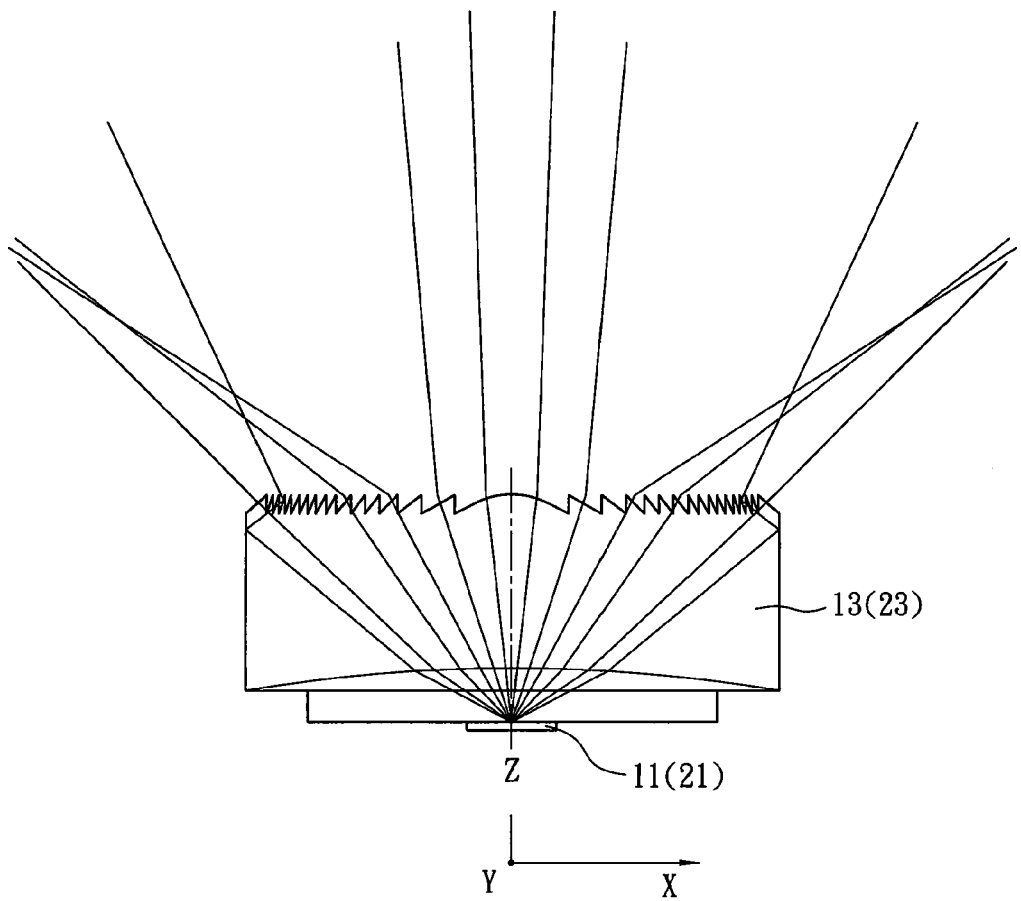
FIG. 8 shows light paths of LED assembly of an embodiment according to the present invention.

Refer to FIG. 8, light from the LED chip 11 (21) is concentrated and refracted by the lens 13 (23) to form a required elliptic distribution pattern that satisfies the condition of $\beta/\alpha \geq 85\%$ at an angle of $2\phi$ ($2\phi_x$ in the X direction and $2\phi_y$ in the Y direction). Neglecting attenuation such as air refraction and scattering, the equation (7) is satisfied. Therefore, by a plano-concave or plano-plano Fresnel LED lens and a LED chip, the LED assembly 10 (20) can emit preset Elliptic distribution pattern with uniform light intensity. Moreover, the LED assembly can be used in the form of a single assembly or an array formed by the LED assemblies with different distribution patterns.

In an embodiment of the present invention, the LED chip 11 is a blu-ray whose size is 1.85×0.77 mm, 1st peak wave-length is 450 nm, and 2nd peak wave-length is 550 nm. The blue light has diverge angle of $\omega_x$=39.8° in the X direction and $\omega_y$=35.2° in the Y direction for last light beam, α=78.5 lm, and light intensity $E_d$=23.97 Lux. The diameter of the lens 13(23) is 5 mm (D=2.5 mm). The optical surface on the forward side R2 is a Fresnel optical surface having vertical shape, and equal zone height/or equal zone pitch. The gel layer 12 is made from transparent optical silicon gel with refractive index of 1.491. As to the LED assembly with a primary optical lens, other components except the lens and LED assembly of the present invention are obvious to those in the art. Thus the size and material of the components, wavelength and emitting angle of LED, patterns, the zone pitch and the zone height of the Fresnel optical surfaces all can be changed, modified and even substituted with equal effect parts.

As to the following thirteen embodiments, in the first to seventh embodiments, a LED assembly with a plano-plano Fresnel lens that is with no taper and equal zone height is used. In the eighth and ninth embodiments, a LED assembly with a plano-plano Fresnel lens that is with taper and equal zone height is used. In the tenth and eleventh embodiments, a LED assembly with a plano-plano Fresnel lens that is with no taper and equal zone pitch is used. In the twelfth and thirteenth embodiments, a LED assembly with a plano-concave Fresnel lens that is with no taper and equal zone height is used.

Two tables are shown in the following each embodiment respectively, wherein the first table includes data of curvature radius R (unit: mm) of the source-side optical surface R1 as well as that of the optical surface on the source side R2, or curvature radius $R_F$ (unit: mm), along a central axis Z from the source side to the forward side, the on-axis surface spacing di (unit: mm), the taper v of the lens (13~23), respective refractive index ($N_d$) and the optical surface number. Denoted that labeled with * is an aspherical Fresnel optical surface. The second table is shown the respective parameters in the equation (9) of the aspherical Fresnel optical surface, radius $r_1$ of a first Fresnel zone from the center of the lens, radius $r_n$ of the last Fresnel zone, Fresnel zone height $h_d$ and number of Fresnel zones.

The First Embodiment

Figure 12:
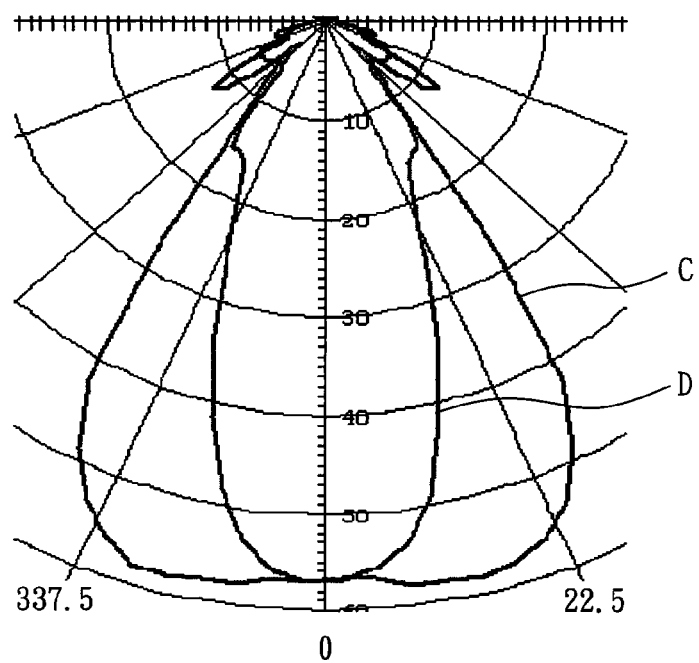
FIG. 12 shows relationship between light intensity distribution of the first embodiment of the LED assembly and grazing angle in a polar coordinate system light.

Refer to FIG. 6, FIG. 12

TABLE ONE fs = 2.024 v = 0

| Surface No. | R or $R_F$ | $d_i$ | $N_{di}$ |
|---|---|---|---|
| S0 | ∞ | 0.10 | |
| S1 | ∞ | 0.52 | 1.410 |
| S2* | 1.000 | 2.00 | 1.582 |

*Aspherical Zone Fesnel

TABLE TWO

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.1 | 0.447 | 2.490 | 31 |

In this embodiment, the lens 13 is made from glass with refractive index Nd2 of 1.582 and Abbe number vd2 of 61.7. The light is concentrated by the lens 13 to form an elliptic distribution pattern, 68° in the X direction, 30° in the Y direction and the luminous flux β=69.201 lm at infinity (100× $f_s$) without consideration of air refraction and scattering. The following values satisfy the equation (1), equation (2), equation (3) and equation (7):

$\eta = 0.8815$ $I_{1/2} = 33.5$ $\phi_x = 32.5$ $\phi_y = 15.2$ $\dfrac{f_s}{r_n} = 0.8130$ $(N_{d2} - 1)\dfrac{d_2}{f_s} = 0.5751$ $\sqrt{\left(\dfrac{\phi_x - \omega_x}{\pi}\right)^2 + \left(\dfrac{\phi_y - \omega_y}{\pi}\right)^2} \cdot f_g = 0.2394$ $\dfrac{E_{1/2}}{E_d} = 0.4489$ By the above table one and table two as well as FIG. 12, it has been proved that the LED assembly with plano-Fresnel LED lens of the invention can achieve higher efficiency and generate an elliptic distribution pattern with uniform peak intensity so as to increase the application of the invention.

The Second Embodiment

Figure 13:
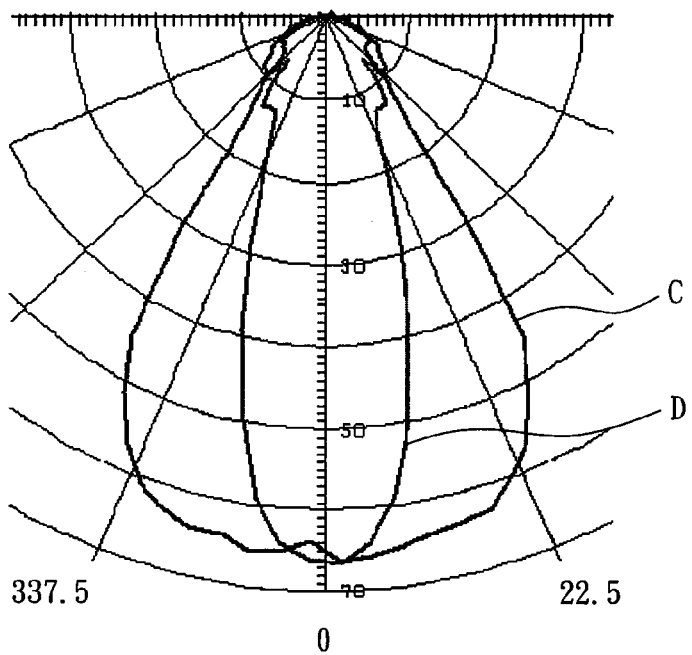
FIG. 13 shows relationship between light intensity distribution of the second embodiment of the LED assembly and grazing angle in a polar coordinate system light.

Refer to FIG. 6 & FIG. 13

TABLE THREE f = 2.530 v = 0

| Surface No. | R or $R_F$ | $d_i$ | $Nd_i$ |
|---|---|---|---|
| S0 | ∞ | 0.10 | |
| S1 | ∞ | 0.52 | 1.410 |
| S2* | 1.250 | 2.00 | 1.582 |

*Aspherical Zone Fesnel

TABLE FOUR

| | K | $A_2$ | $A_4$ | $A_6$ |
|---|---|---|---|---|
| Aspherical Surface | −8.5000E−01 | 0.0000E+00 | 2.4000E−05 | 5.7000E−08 |

| | $h_d$ | $r_1$ | $r_n$ | No. of Zone |
|---|---|---|---|---|
| Fesnel Surface (mm) | 0.1 | 0.499 | 2.480 | 30 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 68° in the X direction, 33° in the Y direction and the luminous flux β=70.245 lm at infinity (100× $f_s$) without consideration of air refraction and scattering. The following values satisfy the equation (1), equation (2), equation (3) and equation (7):

$\eta = 0.8948$ $I_{1/2} = 32.5$ $\phi_x = 33.7$ $\phi_y = 16.8$ $\dfrac{f_s}{r_n} = 1.0203$ $(N_{d2} - 1)\dfrac{d_2}{f_s} = 1.1410$ $\sqrt{\left(\dfrac{\phi_x - \omega_x}{\pi}\right)^2 + \left(\dfrac{\phi_y - \omega_y}{\pi}\right)^2} \cdot f_g = 0.1319$ $\dfrac{E_{1/2}}{E_d} = 0.3915$ By the above table three and table four as well as FIG. 13, it has been proved that the LED assembly with plano-Fresnel LED lens of the invention can achieve higher efficiency and generate an elliptic distribution pattern with uniform peak intensity so as to increase the application of the invention.

The Third Embodiment

Figure 14:
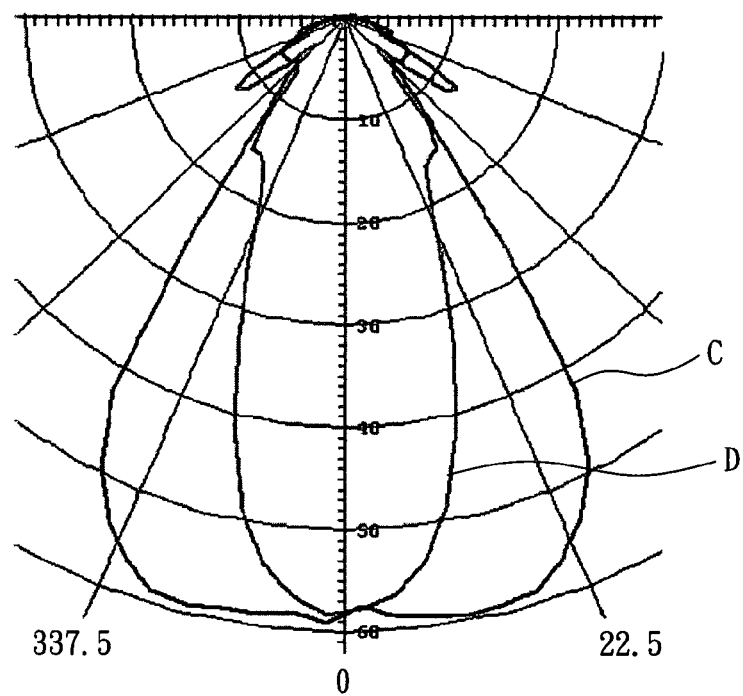
FIG. 14 shows relationship between light intensity distribution of the third embodiment of the LED assembly and grazing angle in a polar coordinate system light.

Refer to FIG. 6 & FIG. 14

TABLE FIVE fs = 2.530 υ = 0

| Surface No. | R or $R_F$ | $d_i$ | $N_{di}$ |
|---|---|---|---|
| S0 | ∞ | 0.10 | |
| S1 | ∞ | 0.52 | 1.410 |
| S2* | 1.250 | 2.00 | 1.582 |

*Aspherical Zone Fesnel

TABLE SIX

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.510 | 42 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 64° in the X direction, 36° in the Y direction and the luminous flux β=69.816 lm at infinity (100× $f_s$) without consideration of air refraction and scattering. The following values satisfy the equation (1), equation (2), equation (3) and equation (7):

$$\eta = 0.8893$$
$$I_{1/2} = 30.0$$
$$\phi_x = 32.1$$
$$\phi_y = 18.1$$
$$\frac{f_s}{r_n} = 1.0081$$
$$(N_{d2} - 1)\frac{d_2}{f_s} = 0.4601$$
$$\sqrt{\left(\frac{\phi_x - \omega_x}{\pi}\right)^2 + \left(\frac{\phi_y - \omega_y}{\pi}\right)^2} \cdot f_g = 0.2108$$
$$\frac{E_{1/2}}{E_d} = 0.3406$$

By the above table five and table six as well as FIG. 14, it has been proved that the LED assembly with plano-Fresnel LED lens of the invention can achieve higher efficiency and generate an elliptic distribution pattern with uniform peak intensity so as to increase the application of the invention.

The Fourth Embodiment

Figure 15:
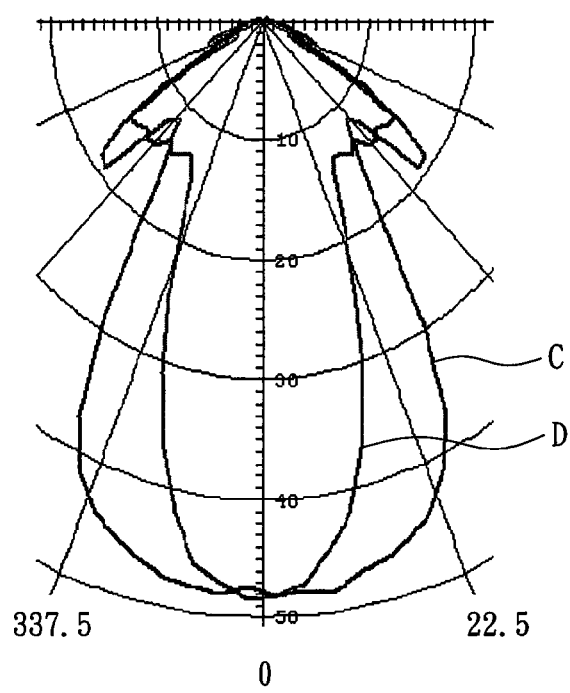
FIG. 15 shows relationship between light intensity distribution of the fourth embodiment of the LED assembly and grazing angle in a polar coordinate system light.

Refer to FIG. 6 & FIG. 15

TABLE SEVEN f = 2.530 υ = 0

| Surface No. | R or $R_F$ | $d_i$ | $Nd_i$ |
|---|---|---|---|
| S0 | ∞ | 0.10 | |
| S1 | ∞ | 0.52 | 1.410 |
| S2* | 1.250 | 2.00 | 1.491 |

*Aspherical Zone Fesnel

TABLE EIGHT

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.510 | 41 |

In this embodiment, the lens 13 is made from PMMA plastic with refractive index $N_{d2}$ of 1.491 and Abbe number $v_{d2}$ of 32. The light is concentrated by the lens 13 to form an elliptic distribution pattern, 68° in the X direction, 43° in the Y direction and the luminous flux β=72.48 lm at infinity (100×$f_s$) without consideration of air refraction and scattering. The following values satisfy the equation (1), equation (2), equation (3) and equation (7).

$$\eta = 0.9233$$
$$I_{1/2} = 23.5$$
$$\phi_x = 34.0$$
$$\phi_y = 21.5$$
$$\frac{f_s}{r_n} = 1.0081$$
$$(N_{d2} - 1)\frac{d_2}{f_s} = 0.3881$$
$$\sqrt{\left(\frac{\phi_x - \omega_x}{\pi}\right)^2 + \left(\frac{\phi_y - \omega_y}{\pi}\right)^2} \cdot f_g = 0.1672$$
$$\frac{E_{1/2}}{E_d} = 0.2231$$

By the above table seven and table eight as well as FIG. 15, it has been proved that the LED assembly with plano-Fresnel LED lens of the invention can achieve higher efficiency and generate an elliptic distribution pattern with uniform peak intensity so as to increase the application of the invention.

The Fifth Embodiment

Figure 16:
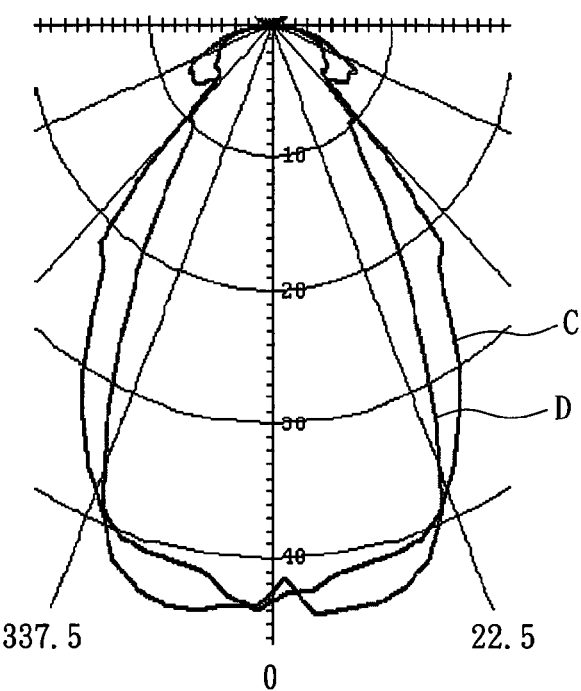
FIG. 16 shows relationship between light intensity distribution of the fifth embodiment of the LED assembly and grazing angle in a polar coordinate system light.

Refer to FIG. 6 & FIG. 16

TABLE NINE

| | fs = 5.061 υ = 0 | | |
|---|---|---|---|
| Surface No. | R or $R_F$ | $d_i$ | $N_{di}$ |
| S0 | ∞ | 0.10 | |
| S1 | ∞ | 0.52 | 1.410 |
| S2* | 2.500 | 2.00 | 1.582 |

*Spherical Zone Fesnel

TABLE TEN

| | $r_t$ | $r_n$ | No. of Zone |
|---|---|---|---|
| Fesnel Surface (mm) | 0.0625 | 2.500 | 41 |

In this embodiment, the lens 13 is made from glass with refractive index $N_{d2}$ of 1.582 and Abbe number $v_{d2}$ of 61.7. The light is concentrated by the lens 13 to form an elliptic distribution pattern 68° in the X direction, 43° in the Y direction and the luminous flux β=72.48 lm at infinity (100×$f_s$) without consideration of air refraction and scattering. The following values satisfy the equation (1), equation (2), equation (3) and equation (7).

$\eta = 0.8980$ $I_{1/2} = 22.5$ $\phi_x = 43.0$ $\phi_y = 34.5$ $\dfrac{f_s}{r_n} = 2.0243$ $(N_{d2} - 1)\dfrac{d_2}{f_s} = 0.2300$ $\sqrt{\left(\dfrac{\phi_x - \omega_x}{\pi}\right)^2 + \left(\dfrac{\phi_y - \omega_y}{\pi}\right)^2} \cdot f_g = 0.4536$ $\dfrac{E_{1/2}}{E_d} = 0.1111$ By the above table nine and table ten as well as FIG. 16, it has been proved that the LED assembly with plano-Fresnel LED lens of the invention can achieve higher efficiency and generate an elliptic distribution pattern with uniform peak intensity so as to increase the application of the invention.

The Sixth Embodiment

Figure 17:
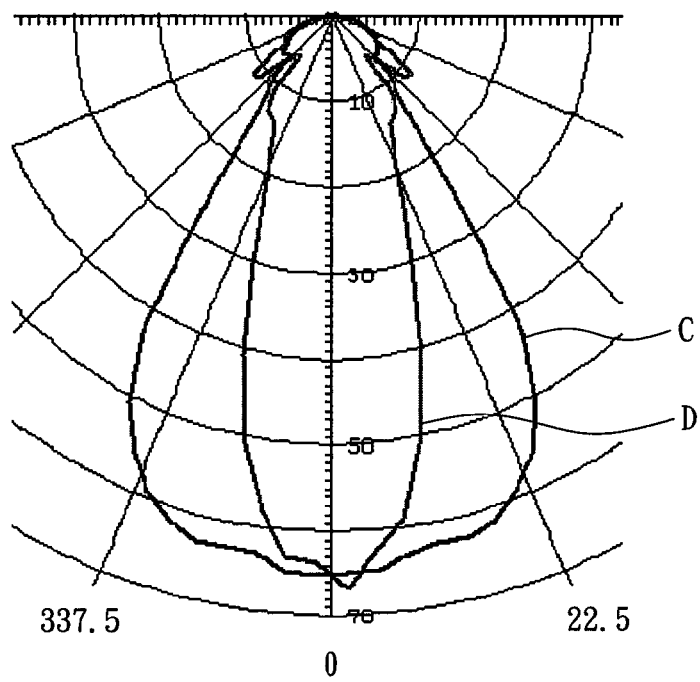
FIG. 17 shows relationship between light intensity distribution of the sixth embodiment of the LED assembly and grazing angle in a polar coordinate system light.

Refer to FIG. 6 & FIG. 17

TABLE ELEVEN

| | fs = 2.530 υ = 0 | | |
|---|---|---|---|
| Surface No. | R or $R_F$ | $d_i$ | $N_{di}$ |
| S0 | ∞ | 0.10 | |
| S1 | ∞ | 0.52 | 1.410 |
| S2* | 1.250 | 4.96 | 1.582 |

*Aspherical Zone Fesnel

TABLE TWELVE

| | K | $A_2$ | $A_4$ | $A_6$ |
|---|---|---|---|---|
| Aspherical Surface | −9.0000E−01 | 0.0000E+00 | 2.4000E−05 | 5.7000E−08 |

| | $h_d$ | $r_1$ | $r_n$ | No. of Zone |
|---|---|---|---|---|
| Fesnel Surface (mm) | 0.06 | 0.387 | 2.478 | 46 |

In this embodiment, the lens 13 is made from glass with refractive index Nd2 of 1.582 and Abbe number vd2 of 61.7. The light is concentrated by the lens 13 to form an elliptic distribution pattern 68° in the X direction, 43° in the Y direction and the luminous flux β=72.48 lm at infinity (100×$f_s$) without consideration of air refraction and scattering. The following values satisfy the equation (1), equation (2), equation (3) and equation (7).

$\eta = 0.8913$ $I_{1/2} = 32.5$ $\phi_x = 31.0$ $\phi_y = 17.0$ $\dfrac{f_s}{r_n} = 1.0213$ $(N_{d2} - 1)\dfrac{d_2}{f_s} = 1.1401$ $\sqrt{\left(\dfrac{\phi_x - \omega_x}{\pi}\right)^2 + \left(\dfrac{\phi_y - \omega_y}{\pi}\right)^2} \cdot f_g = 0.1030$ $\dfrac{E_{1/2}}{E_d} = 0.4161$ By the above table eleven and table twelve as well as FIG. 17, it has been proved that the LED assembly with plano-Fresnel LED lens of the invention can achieve higher efficiency and generate an elliptic distribution pattern with uniform peak intensity so as to increase the application of the invention.

The Seventh Embodiment

Figure 18:
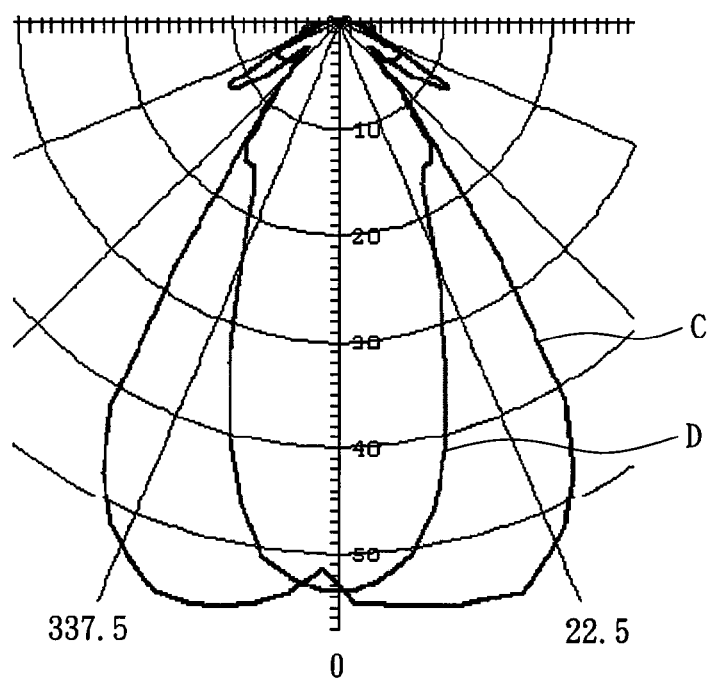
FIG. 18 shows relationship between light intensity distribution of the seventh embodiment of the LED assembly and grazing angle in a polar coordinate system light.

Refer to FIG. 6 & FIG. 18

TABLE THIRTEEN

| | fs = 2.530 υ = 0 | | |
|---|---|---|---|
| Surface No. | R or $R_F$ | $d_i$ | $N_{di}$ |
| S0 | ∞ | 0.10 | |
| S1 | ∞ | 0.52 | 1.410 |
| S2* | 1.250 | 4.99 | 1.582 |

*Aspherical Zone Fesnel

TABLE FOURTEEN

| | K | $A_2$ | $A_4$ | $A_6$ |
|---|---|---|---|---|
| Aspherical Surface | −1.1000E+00 | 0.0000E+00 | 2.4000E−05 | 5.7000E−08 |

| | $h_d$ | $r_1$ | $r_n$ | No. of Zone |
|---|---|---|---|---|
| Fesnel Surface (mm) | 0.06 | 0.388 | 2.494 | 38 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 65° in the X direction, 40° in the Y direction and the luminous flux β=69.33 lm at infinity (100× $f_s$) without consideration of air refraction and scattering. The following values satisfy the equation (1), equation (2), equation (3) and equation (7).

$$\eta = 0.8832$$
$$I_{1/2} = 27.5$$
$$\phi_x = 33.7$$
$$\phi_y = 19.5$$
$$\frac{f_s}{r_n} = 1.0146$$
$$(N_{d2} - 1)\frac{d_2}{f_s} = 1.1475$$
$$\sqrt{\left(\frac{\phi_x - \omega_x}{\pi}\right)^2 + \left(\frac{\phi_y - \omega_y}{\pi}\right)^2} \cdot f_g = 0.1252$$
$$\frac{E_{1/2}}{E_d} = 0.2799$$

By the above table thirteen and table fourteen as well as FIG. 18, it has been proved that the LED assembly with plano-Fresnel LED lens of the invention can achieve higher efficiency and generate an elliptic distribution pattern with uniform peak intensity so as to increase the application of the invention.

The Eighth Embodiment

Figure 19:
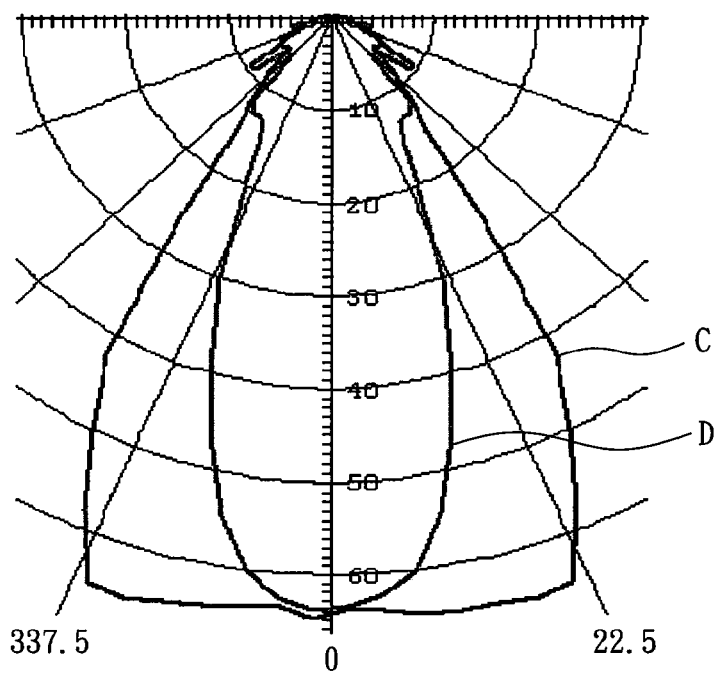
FIG. 19 shows relationship between light intensity distribution of the eighth embodiment of the LED assembly and grazing angle in a polar coordinate system light.

Refer to FIG. 6 & FIG. 19

TABLE FIFTEEN

| | fs = 2.530 υ = 3.505 | | |
|---|---|---|---|
| Surface No. | R or $R_F$ | $d_i$ | $N_{di}$ |
| S0 | ∞ | 0.10 | |
| S1 | ∞ | 0.52 | 1.410 |
| S2* | 1.250 | 2.00 | 1.582 |

*Aspherical Zone Fesnel

TABLE SIXTEEN

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.387 | 37 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 65° in the X direction, 60° in the Y direction and the luminous flux β=69.588 lm at infinity (100× $f_s$) without consideration of air refraction and scattering. The following values satisfy the equation (1), equation (2), equation (3) and equation (7).

$$\eta = 0.8976$$
$$I_{1/2} = 22.0$$
$$\phi_x = 37.5$$
$$\phi_y = 27.0$$
$$\frac{f_s}{r_n} = 1.0598$$
$$(N_{d2} - 1)\frac{d_2}{f_s} = 0.4601$$
$$\sqrt{\left(\frac{\phi_x - \omega_x}{\pi}\right)^2 + \left(\frac{\phi_y - \omega_y}{\pi}\right)^2} \cdot f_g = 0.2176$$
$$\frac{E_{1/2}}{E_d} = 0.3022$$

By the above table fifteen and table sixteen as well as FIG. 19, it has been proved that the LED assembly with plano-Fresnel LED lens of the invention can achieve higher efficiency and generate an elliptic distribution pattern with uniform peak intensity so as to increase the application of the invention.

The Ninth Embodiment

Figure 20:
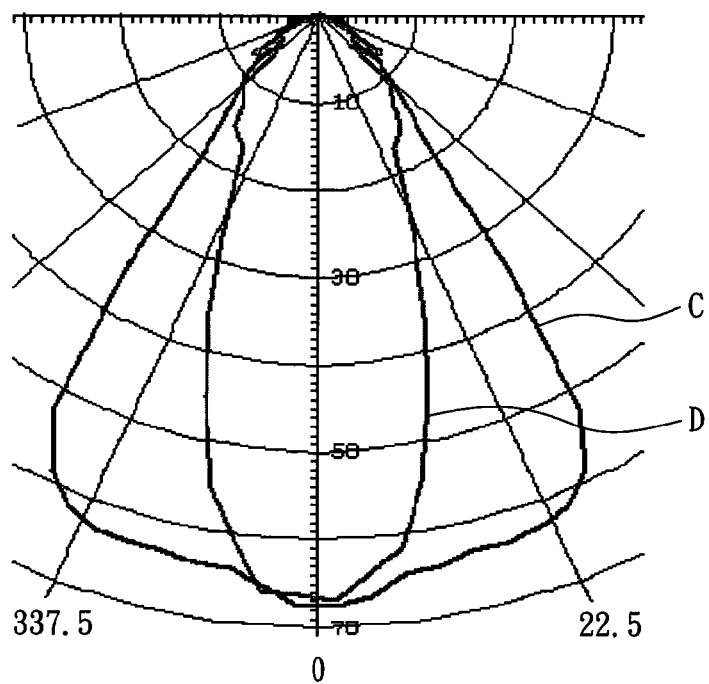
FIG. 20 shows relationship between light intensity distribution of the ninth embodiment of the LED assembly and grazing angle in a polar coordinate system light.

Refer to FIG. 6 & FIG. 20

TABLE SEVENTEEN $f_s = 2.530 \ \upsilon = 7.172$

| Surface No. | R or $R_F$ | $d_i$ | $N_{di}$ |
|---|---|---|---|
| S0 | ∞ | 0.10 | |
| S1 | ∞ | 0.52 | 1.410 |
| S2* | 1.250 | 2.00 | 1.582 |

*Aspherical Zone Fesnel

TABLE EIGHTEEN

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.258 | 33 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 68° in the X direction, 33° in the Y direction and the luminous flux β=71.267 lm at infinity (100× $f_s$) without consideration of air refraction and scattering. The following values satisfy the equation (1), equation (2), equation (3) and equation (7).

$\eta = 0.9078$ $I_{1/2} = 34.0$ $\phi_x = 33.8$ $\phi_y = 16.8$ $\dfrac{f_s}{r_n} = 1.2045$ $(N_{d2} - 1)\dfrac{d_2}{f_s} = 0.4601$ $\sqrt{\left(\dfrac{\phi_x - \omega_x}{\pi}\right)^2 + \left(\dfrac{\phi_y - \omega_y}{\pi}\right)^2} \cdot f_g = 0.2176$ $\dfrac{E_{1/2}}{E_d} = 0.4998$ By the above table seventeen and table eighteen as well as FIG. 20, it has been proved that the LED assembly with plano-Fresnel LED lens of the invention can achieve higher efficiency and generate an elliptic distribution pattern with uniform peak intensity so as to increase the application of the invention.

The Tenth Embodiment

Figure 21:
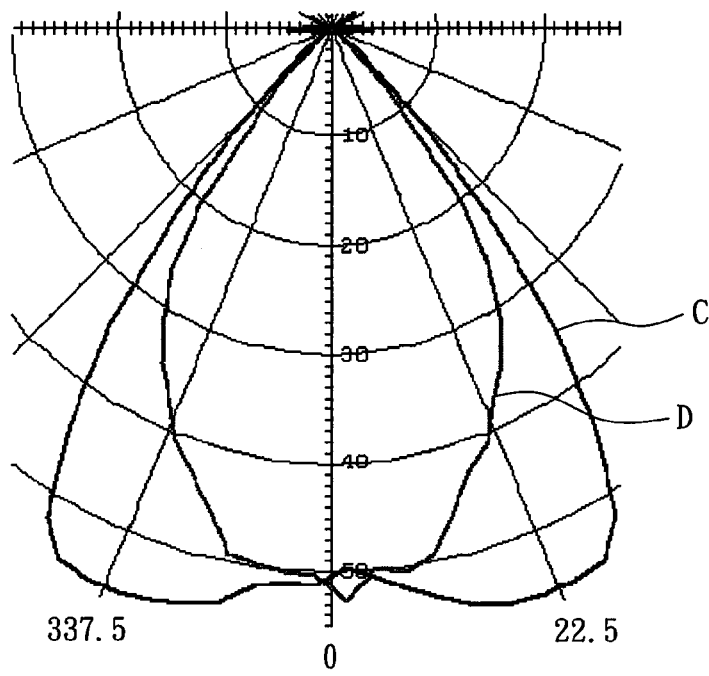
FIG. 21 shows relationship between light intensity distribution of the tenth embodiment of the LED assembly and grazing angle in a polar coordinate system light.

Refer to FIG. 6 & FIG. 21

TABLE NINETEEN $f_s = 2.530 \ \upsilon = 0$

| Surface No. | R or $R_F$ | $d_i$ | $N_{di}$ |
|---|---|---|---|
| S0 | ∞ | 0.10 | |
| S1 | ∞ | 0.52 | 1.410 |
| S2* | 1.250 | 2.00 | 1.582 |

*Aspherical Zone Fesnel

TABLE TWENTY

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $r_t$ | $r_n$ | No. of Zone |
|---|---|---|---|
| Fesnel Surface (mm) | 0.5 | 2.500 | 5 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 68° in the X direction, 70° in the Y direction and the luminous flux β=72.056 lm at infinity (100× $f_s$) without consideration of air refraction and scattering. The following values satisfy the equation (1), equation (2), equation (3) and equation (7).

$\eta = 0.9214$ $I_{1/2} = 26.0$ $\phi_x = 40.5$ $\phi_y = 35.0$ $\dfrac{f_s}{r_n} = 1.0121$ $(N_{d2} - 1)\dfrac{d_2}{f_s} = 0.4601$ $\sqrt{\left(\dfrac{\phi_x - \omega_x}{\pi}\right)^2 + \left(\dfrac{\phi_y - \omega_y}{\pi}\right)^2} \cdot f_g = 0.0081$ $\dfrac{E_{1/2}}{E_d} = 0.1366$ By the above table nineteen and table twenty as well as FIG. 21, it has been proved that the LED assembly with plano-Fresnel LED lens of the invention can achieve higher efficiency and generate an elliptic distribution pattern with uniform peak intensity so as to increase the application of the invention.

The Eleventh Embodiment

Figure 22:
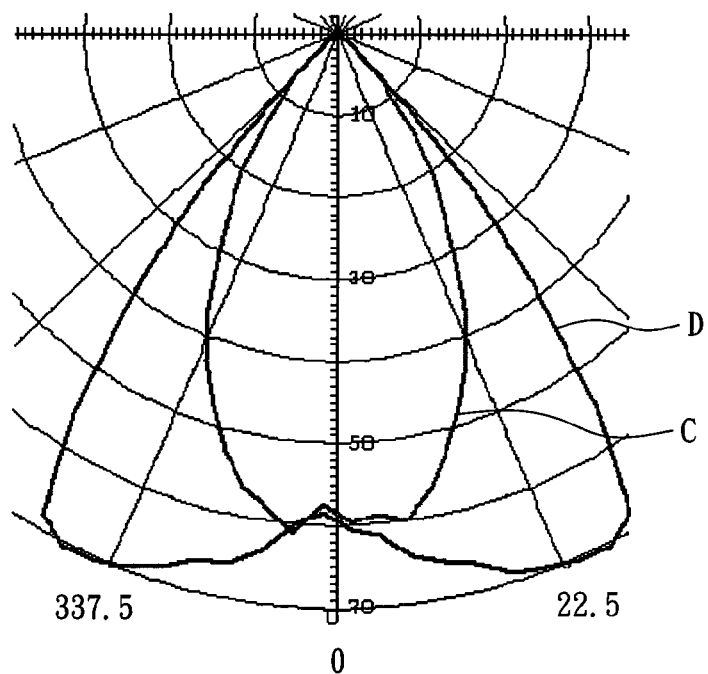
FIG. 22 shows relationship between light intensity distribution of the eleventh embodiment of the LED assembly and grazing angle in a polar coordinate system light.

Refer to FIG. 6 & FIG. 22

TABLE TWENTY-ONE

| | fs = 2.530 υ = 0 | | |
|---|---|---|---|
| Surface No. | R or $R_F$ | $d_i$ | $N_{di}$ |
| S0 | ∞ | 0.10 | |
| S1 | ∞ | 0.52 | 1.410 |
| S2* | 1.250 | 2.00 | 1.582 |

*Aspherical Zone Fesnel

TABLE TWENTY-TWO

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $r_t$ | $r_n$ | No. of Zone |
|---|---|---|---|
| Fesnel Surface (mm) | 0.0625 | 2.500 | 40 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 60° in the X direction, 80° in the Y direction and the luminous flux β=72.164 lm at infinity (100× $f_s$) without consideration of air refraction and scattering. The following values satisfy the equation (1), equation (2), equation (3) and equation (7).

$$\eta = 0.9192$$

$$I_{1/2} = 30.0$$

$$\phi_x = 39.4$$

$$\phi_y = 30$$

$$\frac{f_s}{r_n} = 1.0121$$

$$(N_{d2} - 1)\frac{d_2}{f_s} = 0.4601$$

$$\sqrt{\left(\frac{\phi_x - \omega_x}{\pi}\right)^2 + \left(\frac{\phi_y - \omega_y}{\pi}\right)^2} \cdot f_g = 0.1147$$

$$\frac{E_{1/2}}{E_d} = 0.2184$$

By the above table twenty-one and table twenty-two as well as FIG. 22, it has been proved that the LED assembly with plano-Fresnel LED lens of the invention can achieve higher efficiency and generate an elliptic distribution pattern with uniform peak intensity so as to increase the application of the invention.

The Twelfth Embodiment

Figure 23:
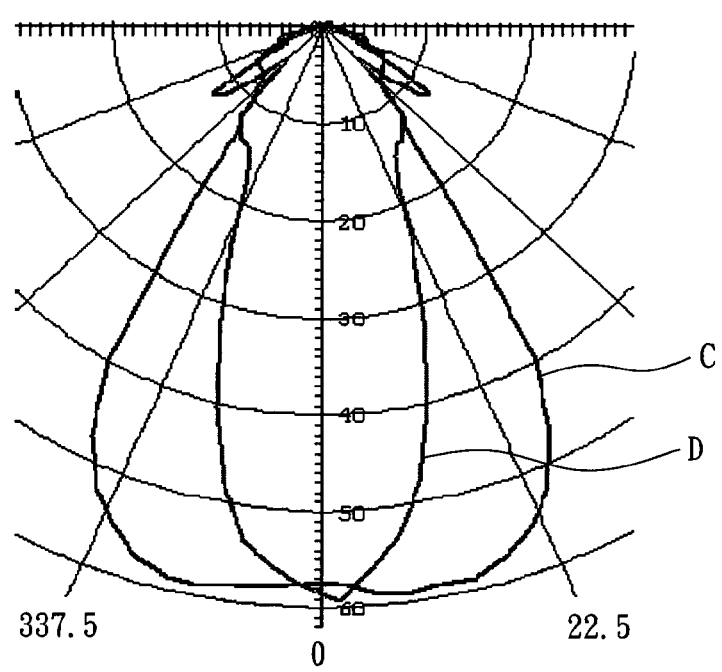
FIG. 23 shows relationship between light intensity distribution of the twelfth embodiment of the LED assembly and grazing angle in a polar coordinate system light.

Refer to FIG. 6 & FIG. 23

TABLE TWENTY-THREE

| | fs = 2.530 υ = 0 | | |
|---|---|---|---|
| Surface No. | R or $R_F$ | $d_i$ | $N_{di}$ |
| S0 | ∞ | 0.10 | |
| S1 | 30.00 | 0.62 | 1.410 |
| S2* | 1.250 | 1.90 | 1.582 |

*Aspherical Zone Fesnel

TABLE TWENTY-FOUR

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.510 | 42 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 60° in the X direction, 40° in the Y direction and the luminous flux β=69.506 lm at infinity (100× $f_s$) without consideration of air refraction and scattering. The following values satisfy the equation (1), equation (2), equation (3) and equation (7).

$$\eta = 0.8854$$

$$I_{1/2} = 30.0$$

$$\phi_x = 33.1$$

$$\phi_y = 19.0$$

$$\frac{f_s}{r_n} = 1.0008$$

$$(N_{d2} - 1)\frac{d_2}{f_s} = 0.4361$$

$$\sqrt{\left(\frac{\phi_x - \omega_x}{\pi}\right)^2 + \left(\frac{\phi_y - \omega_y}{\pi}\right)^2} \cdot f_g = 0.2053$$

$$\frac{E_{1/2}}{E_d} = 0.2188$$

By the above table twenty-three and table twenty-four as well as FIG. 23, it has been proved that the LED assembly with plano-Fresnel LED lens of the invention can achieve higher efficiency and generate an elliptic distribution pattern with uniform peak intensity so as to increase the application of the invention.

The Thirteenth Embodiment

Figure 24:
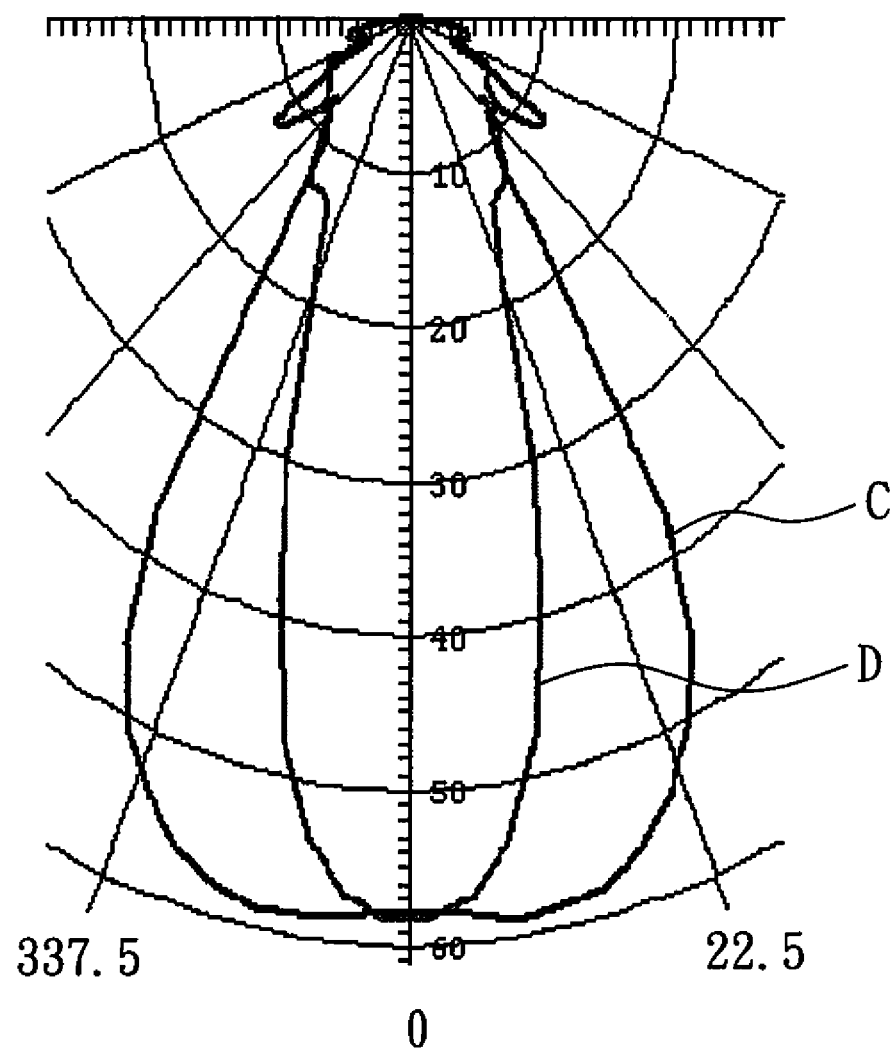
FIG. 24 shows relationship between light intensity distribution of the thirteenth embodiment of the LED assembly and grazing angle in a polar coordinate system light.

Refer to FIG. 6 & FIG. 24

TABLE TWENTY-FIVE fs = 2.530 υ = 0

| Surface No. | R or $R_F$ | $d_i$ | $N_{di}$ |
|---|---|---|---|
| S0 | ∞ | 0.10 | |
| S1 | 9.00 | 0.87 | 1.410 |
| S2* | 1.250 | 1.65 | 1.582 |

*Aspherical Zone Fesnel

TABLE TWENTY-SIX

| | K | $A_2$ | $A_4$ | $A_6$ |
|---|---|---|---|---|
| Aspherical Surface | −1.0000E+00 | 0.0000E+00 | 0.0000E+00 | 0.0000E+00 |

| | $h_d$ | $r_1$ | $r_n$ | No. of Zone |
|---|---|---|---|---|
| Fesnel Surface (mm) | 0.06 | 0.387 | 2.510 | 35 |

In this embodiment, the lens 13 is made from glass with refractive index $N_{d2}$ of 1.582 and Abbe number $v_{d2}$ of 61.7. The light is concentrated by the lens 13 to form an elliptic distribution pattern, 60° in the X direction, 40° in the Y direction and the luminous flux β=69.506 lm at infinity (100× $f_s$) without consideration of air refraction and scattering. The following values satisfy the equation (1), equation (2), equation (3) and equation (7).

$$\eta = 0.8828$$

$$I_{1/2} = 29.0$$

$$\phi_x = 31.0$$

$$\phi_y = 20.2$$

$$\frac{f_s}{r_n} = 1.0081$$

$$(N_{d2} - 1)\frac{d_2}{f_s} = 0.3786$$

$$\sqrt{\left(\frac{\phi_x - \omega_x}{\pi}\right)^2 + \left(\frac{\phi_y - \omega_y}{\pi}\right)^2} \cdot f_g = 0.2227$$

$$\frac{E_{1/2}}{E_d} = 0.2103$$

By the above table twenty-five and table twenty-six as well as FIG. 24, it has been proved that the LED assembly with plano-Fresnel LED lens of the invention can achieve higher efficiency and generate an elliptic distribution pattern with uniform peak intensity so as to increase the application of the invention.

What is claimed is:

1. A plano-Fresnel LED (Light emitting diode) lens, applied to a LED assembly having a LED chip, a gel layer and a lens along a central axis from a source side to a forward side, comprising: an optical surface on the forward side and an optical surface on the source side; wherein the optical surface on forward side is a plano-Fresnel optical surface with vertical draft so as to make light from the LED chip pass through the gel layer, the lens and form an elliptic distribution pattern on the forward side, and the lens satisfies conditions of:

$$0.7 \le \frac{f_s}{r_n} \le 2.2$$

$$0.1 \le (N_{d2} - 1)\frac{d_2}{f_s} \le 1.25$$

wherein $f_s$ is effective focal length, $r_n$ is radius of a last zone of a Fresnel optical surface, $d_2$ is thickness of the lens on a central axis, and $N_{d2}$ is refractive index of the lens.

2. The plano-Fresnel LED lens as claimed in claim 1, wherein the lens further satisfies following conditions:

$$\sqrt{\left(\frac{\phi_x - \omega_x}{\pi}\right)^2 + \left(\frac{\phi_y - \omega_y}{\pi}\right)^2} \cdot f_g \le 0.6$$

wherein:

$$f_g = \left|\left(\frac{1}{R_1} - \frac{1}{R_F}\right) \cdot f_s\right|$$

$$\omega_x = \tan^{-1}\left(\frac{D}{d0 + d1 + d2 + Lx}\right)$$

$$\omega_y = \tan^{-1}\left(\frac{D}{d0 + d1 + d2 + Ly}\right)$$

wherein $f_s$ is effective focal length of the lens, $2\phi_x$(deg.) is an angle of a half of highest light intensity ($I_{1/2}$) in the X direction of the light emitted from the lens, $2\phi_y$ (deg.) is an angle of a half of highest light intensity ($I_{1/2}$) in the Y direction of the light emitted from the lens, 2Lx is length of the LED chip in the X direction, 2Ly is length of the LED chip in the Y direction, fg is a relative focal length of the lens, $R_1$ is a radius of an optical surface on the source side, $R_F$ is a radius of a fresnel convex surface on the forward side, $d_o$ is thickness of the LED chip, $d_1$ is thickness of a gel layer on the central axis, $d_2$ is thickness of the lens on a central axis, D is radius of an optical surface on the forward side.

3. The plano-Fresnel LED lens as claimed in claim 1, wherein the optical surface on the source side is a flat surface or a concave surface.

4. The plano-Fresnel LED lens as claimed in claim 1, wherein the Fresnel optical surface is with equal zone height or with equal zone pitch.

5. The plano-Fresnel LED lens as claimed in claim 1, wherein an outer surface of the lens is with taper.

6. The plano-Fresnel LED lens as claimed in claim 1, wherein the lens is made from glass optical material or plastic optical material.

7. A LED assembly along a central axis from a source side to a forward side comprising: a LED chip, a gel layer and a plano-Fresnel LED lens of claim 1; wherein the LED assembly generates an elliptic distribution pattern and satisfies conditions of:

$$E_{1/2} \leq 0.6 E_d;$$

$$\text{wherein } E_{1/2} = \frac{I_{1/2}}{(\pi r_n \cdot \sin\phi_x) \cdot (r_n \cdot \sin\phi_y)} \cdot \eta;$$

wherein $r_n$ is radius of a last zone of the Fresnel optical surface, $2\phi_x$ (deg.) is an angle of a half of highest light intensity ($I_{1/2}$) in the X direction of the light emitted from the lens, $2\phi_y$ (deg.) is an angle of a half of highest light intensity ($I_{1/2}$) in the Y direction of the light emitted from the lens $\alpha$ is luminous flux of light emitted from the LED chip, $\beta$ is luminous flux of light at infinity ($100 \times f_s$) on the forward side without consideration of attenuation, $\eta$ is ratio of the luminous flux–$\eta = \beta/\alpha$, $E_d$ is illumination of the LED chip.

8. The LED assembly as claimed in claim 7, wherein the ratio of luminous flux of light emitted from the LED chip to luminous flux of light at infinity on the forward side satisfies:

$$\beta/\alpha \geq 85\%$$

wherein $\alpha$ is luminous flux of light emitted from the LED chip, and $\beta$ is the luminous flux of light at infinity on the forward side of the LED assembly, neglecting air refraction and scattering.

* * * * *